US006548102B2

(12) United States Patent
Fenske et al.

(10) Patent No.: US 6,548,102 B2
(45) Date of Patent: Apr. 15, 2003

(54) REDUCED-FAT SOY COMPOSITIONS AND PREPARATIVE PROCESSES THEREOF

(75) Inventors: Douglas J. Fenske, Waconia, MN (US); William D. Fenske, Waconia, MN (US)

(73) Assignee: Sunrich, Inc., Hope, MN (US)

( * ) Notice: Subject to any disclaimer, the term of this patent is extended or adjusted under 35 U.S.C. 154(b) by 51 days.

(21) Appl. No.: 09/865,899

(22) Filed: May 25, 2001

(65) Prior Publication Data

US 2003/0035879 A1 Feb. 20, 2003

(51) Int. Cl.[7] .................. A23L 1/025; A23L 1/035; A23L 1/20
(52) U.S. Cl. .............. 426/598; 426/490; 426/534; 426/654
(58) Field of Search ................... 426/594, 490, 426/534, 654

(56) References Cited

U.S. PATENT DOCUMENTS

| | | | |
|---|---|---|---|
| 4,041,187 A | 8/1977 | Nelson et al. | 426/598 |
| 4,968,521 A * | 11/1990 | Melnychyn | 426/634 |
| 5,269,939 A | 12/1993 | Laurent et al. | 210/705 |
| 5,591,477 A | 1/1997 | Boyce et al. | 426/633 |
| 6,005,076 A | 12/1999 | Murray | 530/377 |

OTHER PUBLICATIONS

*McCutcheon's vol. 1: Emulsifiers and Detergents,* North American Edition, MC Publishing Company, Glen Rock, New Jersey, (1997).

*McCutcheon's vol. 2: Functional Materials,* North American Edition, MC Publishing Company, Glen Rock, New Jersey, (1997).

* cited by examiner

*Primary Examiner*—Helen Pratt
(74) *Attorney, Agent, or Firm*—Schwegman, Lundberg, Woessner & Kluth, P.A.

(57) ABSTRACT

A process including: mixing a high-fat soybean liquid with at least one demulsifier; and separating the resulting cream component from the reduced-fat liquid component.

17 Claims, No Drawings

REDUCED-FAT SOY COMPOSITIONS AND PREPARATIVE PROCESSES THEREOF

The present invention generally relates to edible soy compositions and more specifically to soy compositions having lowered or reduced total fat content and increased protein content, and to processes for making soy products with a reduced-fat and protein enriched content.

BACKGROUND OF THE INVENTION

Soybean beverages and preparative processes thereof are generally known, reference for example, U.S. Pat. No. 4,041,187. Reduced-fat soymilks are also known and can be produced by, for example, supplementing the non-fat portion of conventionally produced soymilk by, for example, the addition of a soy protein concentrate or a carbohydrate. The added non-fat component decreases the fat content and increases the relative protein-to-fat ratio by dilution. Other processes for oil seed fat-removal or fat-reduction are also known, see for example, U.S. Pat. Nos. 6,005,076 and 5,591,477. Also U.S. Pat. No. 5,269,939, discloses the use of a natural flocculent chitosan to treat soy waste to recover material useful in feed and fuel stocks.

Currently available natural or organic soybean milks typically have a protein-to-fat ratio of about 1.8:1. To ingest the Food and Drug Administration's recommended 6.5 grams of protein in an 8 ounce serving of soy beverage, a consumer would also consume over 3.5 grams of fat. Label regulations for reduced-fat soy beverages limit the fat content to no more than 2 grams per 8 ounce serving, which equates to a protein-to-fat ratio of about 3.25:1. A 3.25:1 ratio was not heretofore readily attainable without resort to adding the above mentioned supplemental soy protein concentrate or carbohydrate. Organic or natural labelling considerations limit the ingredients in soymilk base to soybeans and water and optionally the inclusion of other organically approved process aids or ingredients. Soymilk consumers have expressed concern over the use of other "non-natural" chemical compounds and the effects of residual chemicals in the final reduced-fat soybean products. There is considerable consumer demand for foods that are "organic" which contain only "natural" ingredients.

Soybeans or soy seeds historically contained, for example, from about 13%–26% oil and about 38%–45% protein on a dry weight basis. Soybean oil historically comprised on average 60% polyunsaturated fatty acids, 25% monounsaturated fatty acids, and 15% saturated fatty acids. Reduced-fat soy products have been produced from full-fat soybeans by, for example, extraction with solvents such as hexane or alcohol. Soybeans and liquid soy products, such as soymilks, contain the above mentioned fatty oils in a highly emulsified or dispersed droplet form. The droplets are very stable, very small fat globules that are emulsified by compounds found in the soybeans themselves such as lecithin and other phospholipids. Homogenization of soybean milk is not necessary to prevent the "creaming" phenomena of fatty components as observed in cow's milk. Indeed the use of a centrifuge separator, for example, as commonly used to separate cow's milk into skim milk and cream components, is largely ineffective at separating the cream and skim components of conventionally prepared soymilk.

There remains a need for simple and efficient processes for producing reduced-fat soy products with enhanced protein content generally, and more specifically, processes which separate a high-protein reduced-fat soy milk component from a high-fat cream component contained in liquid soybean preparations.

SUMMARY OF THE INVENTION

Applicants have discovered a process whereby adding particular amounts of emulsifiers, for example, certain food grade emulsifiers such as those obtained from soy beans, to the a raw or full-fat soy milk can destabilize the natural emulsion system to cause demulsification and agglomeration of small emulsified soy bean oil globules into larger clusters. The demulsification and agglomeration enables facile separation of the resulting high-fat and low- or non-fat components. Applicants have further discovered a process for increasing the protein-to-fat ratio of soybean milk by separating a portion, for example, about 0.01 to greater than about 99 percent, and preferably from about 0.1 to greater than about 50 percent, of the suspended or emulsified fat content from raw or full-fat soybean milk. The present invention provides processes for increasing the protein content and decreasing the fat content of soybean milk by, for example, a factor of 2 or more.

Accordingly, the present invention provides, in embodiments:

A process comprising:
  mixing a soybean liquid with at least one demulsifier; and
  separating the resulting cream component from the reduced-fat soy milk component;
A reduced-fat or low-fat content soymilk prepared by the above process; and
An increased-fat or high-fat content soy cream prepared by the above process.

These and other aspects of the present invention are illustrated herein.

DEFINITIONS

The following definition(s) are used, unless otherwise described:

An "emulsifier" is a compound or material which can emulsify two or more dissimilar phases, such as a water-oil mixture, with for example a surface-active agent, such as a soap, and which emulsifier promotes the formation and stabilization of an emulsion.

A "demulsifier" is a compound or material which can destabilize an emulsion, for example, the well emulsified oil or fat particles contained in the starting soy liquid or full-fat soy milk. A demulsifier can be, under the proper conditions such as temperature, concentration, and the like conditions, an emulsifier compound or substance. Demulsifiers as used in the present invention can include, for example, one or more known emulsifiers, surfactants, tensides, detergents, and the like materials, and which materials are capable of achieving the above mentioned destabilization of emulsified fatty oil droplets or particles contained in the starting soy milk. Preferred demulsifier are those materials suitable for human or animal consumption as in, for example, foodstuffs or nutraceuticals.

"HLB" or hydrophile-lipophile balance is a well known metric to those skilled in the art of surfactant and emulsifier technology. HLB rates the specific emulsification power of emulsifier compounds. The HLB of the demulsifier compounds of the present invention corresponds to the known HLB system.

"Soybean milk" or "soy milk" includes any liquid formulation prepared from soybeans.

"Skimmed" is the partial removal of fat from the soy milk, for example, fat removal ranging from about 0.01 to greater than about 99 percent.

from about less than about 10 percent to greater than about 99 weight percent based on the total fat content in the starting soy milk.

DETAILED DESCRIPTION

The present invention provides an efficient and effective method for increasing the protein-to-fat ratio of soybean milk by separating a portion of the suspended or emulsified fat content from the bulk of the soybean milk. The selective depletion is achieved with a demulsifier compound or material.

In embodiments the present invention provides a process comprising:

mixing a soybean liquid with at least one demulsifier; and separating the resulting cream component from the reduced-fat soy milk component. In an embodiment the above mentioned mixing is preferably accomplished with heating at from about 60 to about 90° C., and preferably from about 70 to about 85° C., for a period of from about 1 minute to about 10 hours.

The soybean liquid can be, for example, a full-fat soybean and water mixture with a protein-to-fat weight ratio, such as from about 2.0:1 to about 1.8:1 based on the combined weight of the full-fat soybean and water mixture. The reduced-fat soy milk component can be, for example, a reduced-fat soybean milk with a protein-to-fat weight ratio of from about 4.5:1 to about 3.25:1.

The mixing can be accomplished, for example, at a temperature above room temperature, and preferably at from about 60 to about 90° C., and more preferably from about 70 to about 85° C. The separation or separating of the resulting cream component from the reduced-fat soy milk component can be accomplished with known separation methods and apparatus. An exemplary separation method is centrifugal force and an exemplary apparatus is, for example, a high speed centrifugal separator device, such as used in the dairy industry for separation into cream and skim milk components. An economical separation alternative is gravity settling followed by decantation or filtering although several days including continuously refrigerating the mixture may be required.

The at least one demulsifier can be, for example, mixed with the soybean liquid, such as the full-fat soy milk, in an amount of from about 0.01 to about 1.0 weight percent of "actives" or active demulsifier ingredient based on the weight of the soybean liquid. It is readily appreciated by one skilled in the art that the demulsifier as used in the present invention is, for example, a compound or mixture of compounds which is capable of destabilizing or demulsifying the emulsified fat globules in the soy liquid, or alternatively, capable of facilitating the destabilization the emulsified fat globules in the soy liquid, for example, in combination with changes in temperature, ionic strength, gravity, the like extrinsic and intrinsic system changes. It is also readily appreciated that the emulsifier or emulsifier compounds can be added "neat" to the soy liquid, or alternatively, added in a predispersed or dissolved in a carrier liquid such as water. An excellent resource for emulsifier, demulsifier, and related compounds, their properties, and availability is McCutcheon's, VOL. 1: EMULSIFIERS AND DETERGENTS, and McCutcheon's, and VOLUME 2: FUNCTIONAL MATERIALS, 1997 North American Edition, McCutcheon's, Division, MC Publishing Co., Glen Rock, N.J. An important characteristic of the demulsifier compound or demulsifier mixture is the above mentioned known hydrophile-lipophile balance or "HLB". The demulsifier, that is, the at least one demulsifier can have, in embodiments, an HLB value of for example, from about 2.6 to about 17. In embodiments the demulsifier or demulsifier can have an HLB value of from about 2.8 to about 15, and more preferably an HLB value of from about 2.8 to about 10. There is also a preference for demulsifier which are monoglycerides, di-glycerides, or mixtures thereof. The demulsifier or demulsifiers selected for use in the present invention can be any known demulsifier and which demulsifier or mixture of demulsifiers provide an adequate and desired level of destabilization of emulsified fat particles or globules contained in the raw soy liquid or the starting full-fat soybean milk. The demulsifier or demulsifiers can have, for example, a total monoglyceride content of from about 50 to about 70 weight percent, an alpha-monoglyceride content of from about 45 to about 60 weight percent, and an iodine value, which value is a measure of unsaturation contained in the fatty acid portion of fat molecules, of from about 40 to about 120. In embodiments the at least one demulsifier can be a refined glyceride product and can have an alpha-monoglyceride content of, for example, from about 70 to greater than 90 weight percent and which demulsifier products are also known as "distilled monoglycerides" and are available from Eastman Chemical Co.

The fat containing soy liquid can be added to the demulsifier(s), or alternatively, the demulsifier(s) can be added to the soy liquid to form the mixture. The demulsifier can in embodiments include at least one monoglyceride or mixtures of monoglycerides. In embodiments the demulsifier preferably includes one or more known food grade emulsifiers. A food grade emulsifier can be, for example, ATMOS 3000, ATMUL 500, which are believed to be mixtures of mono- and di-glycerides, ATMUL 651 K which is a mixture of kosher mono- and diglycerides, and ATMUL 695K, ATSURF 596K, or ATSURF 586K which are also believed to be mixtures of mono- and di-glycerides. The foregoing "AT" line of compounds are available from American Ingredients, Co. Other suitable demulsifier compounds are, for example, POLYSORBATE 20 which is available as TWEEN 20 from Imperial Chemical Company (ICI) of New Castle, Del., POLYSORBATE 60, and POLYSORBATE 80 which is the product of a polyethylene oxide and a sorbitan ester, and the like materials, and as listed in Table 1 or Table 2. Another food grade emulsifier or demulsifier suitable for use in the present invention can be, for example, an emulsifier prepared from, isolated from, or derived from soybean fatty acids, which is a by-product of the soybean oil refining process.

The demulsified or destabilized oil particles typically agglomerate into clusters. The clusters possess an apparent increased size, an apparent reduced density, and a higher separation velocity. Thus the agglomerated clusters are capable of being separated, for example, on the basis of a density difference from the higher density bulk of the non-fat portion soy milk which has been depleted of emulsified fatty oil particulates by the demulsifier. Flocculation or clustering is a major destabilizing mechanism for emulsions. After flocculation, fat globules move as clusters or groups rather than as individual globules, and creaming is enhanced.

It is known that stabilizing oil-water mixtures or emulsions to delay or avoid creaming can be accomplished with emulsifiers. The emulsifiers, such as surfactants, absorb at the surface of oil or fat globules to lower interfacial tension between the fat globules and an aqueous bulk liquid making the globules less likely to coalesce into larger droplets or clusters. Conversely, oil-water emulsions can be destabilized by altering the interfacial tension of the emulsified particles to, for example, accelerate separation of the oil and water phases to creaming and as illustrated herein.

In embodiments the above mentioned demulsifier compound or entity, or alternatively, the at least one demulsifier can be a mixture of from 2 to about 10 demulsifier materials. One or more demulsifiers can be selected to provide, for example, process flexibility or full or partial reduction of oil or other emulsified constituents contained in the raw or starting soy liquid.

In embodiments the present invention provides a reduced-fat soymilk product prepared by the above demulsification and separation process and as illustrated herein. In embodiments, the resulting reduced-fat soymilk product prepared by the process of the present invention can have, for example, a protein-to-fat weight ratio from about 3.5:1 to about 3.25:1, a residual demulsifier content of from about 0.001 to about 1.0 weight percent, and a water content of from about 3 to about 95 weight percent, based on the total weight of the reduced-fat soymilk. The foregoing ratios or amounts can vary, or be deliberately modified if desired, such as by an operator or plant personnel, by appropriate changes, for example, in process conditions, selection of demulsifier type or types and amounts, water content and water purity including subsequent addition or removal of water, mix and heat times, temperatures, centrifugation speed and duration, and the like variables.

It is also readily appreciated by one skilled in the art that selection of the demulsifier can include, for example, demulsifier availability, demulsifier source or origin such as natural, synthetic, or mixtures, demulsifying ability, demulsifier cost, and other manufacturing and production considerations, such as the availability of certain processing and handling equipment, such as high, moderate, or low speed centrifuges, refrigeration, high, moderate, or low volume mix tanks or separators, and the like considerations.

TABLE 1

Exemplary Demulsifiers and Properties

| Demulsifier | HLB | % Alpha Mono-glyceride[1] | Total Mono-glyceride[2] | Iodine Value |
|---|---|---|---|---|
| ATMOS 3000 | 2.8 | 47–50 | 54–59 | 74–78 |
| ATMUL 500 | 2.8 | 54–58 | 65–69 | 46–50 |
| ATMUL 651K | 3.5 | 54–58 | 65–69 | 71–75 |
| ATMUL 695K | 3.0 | 52 min | 62 | 73–79 |
| ATSURF 596K | 2.8 | 46–50 | 55–59 | 80–90 |
| ATSURF 586K | 2.8 | 52–56 | 61–66 | 94–108 |
| POLYSORBATE 20 | 16.7 | — | — | — |
| POLYSORBATE 60 | 14.9 | — | — | — |
| POLYSORBATE 80 | 15 | — | — | — |

[1]% Alpha Monoglyceride = the weight percent of alpha monoglycerides, that is, glycerol 1-alkanote compounds.
[2]Total Monoglyceride = the sum total weight percent of alpha and beta monoglycerides.

In embodiments the present invention provides a method for concentrating fatty oil constituents contained in a more dilute suspension or emulsion of fatty oil of a raw or partially processed or formulated soy liquid. The present invention also provides a method for increasing the protein content relative to the fat content contained in a raw or partially processed soy liquid. The protein content can be increased relative to the fat content by depletion of the fat component. The depletion can be accomplished by demulsifying or destabilizing the emulsified fat particles contained in the raw or partially processed soy liquid into agglomerated fat globules with the aid of one or more demulsifiers. The agglomerated fat particles possess different density properties compared to the remaining skimmed soy liquid. The agglomerated fat particles, along with any associated demulsifier and water molecules, form a separate and distinct cream phase or component from the remaining fat depleted bulk phase. The distinct phases can be conveniently separated from each other. The separation rate of the fat globules obeys Stokes law generally and the separation of component phases can be accelerated or facilitated by, for example, known centrifugation or sedimentation apparatus and techniques. The cream component contains primarily high-fat constituents that were contained in and removed from the starting or raw soy liquid by the above demulsification-agglomeration and subsequent separation process and as illustrated herein. The cream component may also contain associated or entrapped demulsifier molecules. The cream component is useful and valuable, for example, as a foodstuff, or as a food additive or ingredient.

The cream component prepared by the processes of the present invention can have, for example, a fat content of from about 20 to about 90 weight percent, a demulsifier content of from about 0.01 to about 1.0 weight percent, and a water content of from about 1 to about 95 weight percent, based on the weight of the cream component. Although not wanting to be limited by theory it is believed that the initial emulsifier concentration added to the soybean liquid, for example, 0.1 weight percent, remains relatively constant and is approximately the same in the respective separated components.

The foregoing ratios or amounts can also vary or be deliberately modified if desired, such as by an operator or plant personnel, by appropriate changes, for example, in process conditions, selection of demulsifier type or types and amounts, water content including subsequent addition or removal of water, time, temperature, centrifugation speed and duration, and the like variables.

Table 2 illustrates exemplary effect of several commercially available demulsifier compounds or materials and there effect on cream layer formation and constitution.

TABLE 2

Exemplary Demulsifier Effects on Cream Layer Formation

| Demulsifier | HLB | Iodine Value | Concentration %[1] | Cream Layer[2] |
|---|---|---|---|---|
| ATMOS 3000 | 2.8 | 74–78 | 0.1 | 0.3 mL/15 mL |
| ATMUL 695K | 3.0 | 73–79 | 0.1 | 0.1 mL/15 mL |
| ATSURF 596K | 2.8 | 80–90 | 0.1 | 0.3 mL/15 mL |
| POLYSORBATE 20 | 16.7 | — | 0.1 | 0.2 mL/15 mL |
| POLYSORBATE 80 | 15 | — | 0.1 | 0.3 mL/15 mL |

[1]Concentration % = the weight percent of demulsifier used based on the total weight of the soybean liquid selected for defatting.
[2]Cream Layer = the volume ratio of cream component formed from the total soybean milk sample(15 mL) following the mixing with a specific demulsifier and centrifugation. The volume of the cream component can be readily determined by examining a graduated centrifuge tube and reading the boundary layer between the volume of the top layer or separated cream component and the lower layer.

The present invention provides in embodiments a process comprising:
   heating a mixture of from about 90 to about 99.99 weight percent of a full-fat soybean milk with from about 0.01 to about 1.0 weight percent a demulsifier at from about 70 to about 85° C., for example, for about 0.5 to about 10 hours, and typically about 1 hour; and centrifugally separating the resulting less-dense cream component from the more-dense non-fat component, wherein the full-fat soybean milk has a protein-to-fat ratio less than from about 2.0:1, and the more dense non-fat component has a protein-to-fat ratio greater than from about 3.25: 1.

In embodiments the resulting more-dense liquid component comprises a reduced-fat soybean increased-protein soybean milk product with, for example, less than about 2 fat grams per 8 ounce serving and more than about 6.5 protein grams per 8 ounce serving of the reduced-fat soybean milk. The starting full-fat soybean milk can have a protein-to-fat ratio less than from about 1.8:1, and the more-dense liquid component can have a protein-to-fat ratio greater than from about 3.5:1. In embodiments where the full-fat soybean milk has a high-fat content, the soybean milk prior to processing in accordance with the present invention can have a protein-to-fat ratio less than from about 1.8:1, such as from about 1.5 to about 1.79, and the more-dense liquid component can have a protein-to-fat ratio greater than from about 4.0: 1, such as from about 4.1:1 to about 4.8:1, and preferably greater than above about 10:1, where readily attainable, for example, with ultra- or extended centrifugation.

The heating of the mixture of the starting soybean liquid with at least one demulsifier can be accomplished, for example, in from about 1 minute to about 24 hours, and more preferably from about 1 minute to about 10 hours. Longer or shorter heating periods can be used and the heating period can depend on for example, the size or geometry of the heating vessel and the volume of the batch, the degree of component separation desired, and the protein-to-fat ratio increase desired, and the like considerations. It is readily understood by one of ordinary skill in the art that the present process for making soy compositions and the use of the soy compositions can further comprise including useful additives into the either or both of the separated components, for example, one or more nutritional or vitamin supplements, flavors, sweeteners, colorants, and the like additives can be added to the separated more-dense liquid component or to the less-dense cream component to enhance the utility or the physical properties of the separated components, such as the nutrition value, the shelf- or package-life, the stability of the formulated constituents, consumer appeal, customer requirements, and the like. It is also readily appreciated by one of ordinary skill in the art that the separated components of the present invention can be, if desire, concentrated partially or completely, for example by spray drying, and the like methods, to form the corresponding paste or powder products and which paste or powder products can be readily reconstituted or reformulated to a liquid formulation by the addition of an appropriate solvent or diluent such as water.

The invention will be further illustrated by the following non-limiting Examples.

EXAMPLE I

Preparation of Reduced-Fat Skim and Cream Components

To a low separable solids soybean milk, for example, as conventionally prepared by one skilled in the art, at a temperature of about 70 to about 85° C., such as 80° C. (175° F.), was added, for example, with stirring, a demulsifier in an amount of from about 0.01 to about 1.0 weight percent, for example, 0.1 weight percent, based on the weight of the soybean liquid. The demulsifier interacts with the soybean milk for a time, such as 1 hour, to effect demulsification of oil constituents. The resulting mixture was separated into streams of a minor less-dense high-fat cream component and a major more-dense skimmed component with centrifugal force using, for example, a cow's milk centrifugal separator, for example, at about 2,500 times gravity for about 1 to 10 minutes. The separated streams were optionally cooled for further processing, formulation, packaging, or storage. The high-fat soy cream component and the reduced-fat liquid or skim component can be consumed directly or formulated into a variety of other edible foodstuffs such as dairy substitutes or complements and baking ingredients. The relative weight proportions of the cream component and the skim component were measured and recorded and the protein-to-fat ratio of the respective separated components was determined using known methods.

EXAMPLE II

Production Scale Preparation of Skimmed Soy Milk and Cream Components

About 500 gallons of raw soybean milk was pumped into a mix tank and heated with stirring to achieve an approximately constant temperature of about 80° C. (175° F.) followed by the addition of a demulsifier AT695K in an amount of about 2,500 mL. The resulting mixture is stirred at temperature for about 1 hour to effect demulsification of oil constituents. The resulting demulsified mixture was separated into streams of a minor less-dense high-fat cream component and a major more-dense skimmed component with centrifugal force using a cow's milk centrifugal separator, for example, at about 2,500 times gravity for about 1 to 10 minutes. The separated streams were optionally cooled for further processing, formulation, packaging, or storage. The relative weight proportions of the cream component and the skim component were measured and recorded and the protein-to-fat ratio of the respective separated components was determined using accepted methods for protein or fat analysis, such as by inspection, gravimetry, chemical, and instrumental methods.

EXAMPLE III

Method for Evaluating Demulsifiers

A centrifuge stability test can be used to assess the stability or instability of a soy liquid emulsion and to assess corresponding effectiveness of a variety of potential emulsifiers or demulsifiers in accomplishing the processes of the present invention. An "unstable" or "destabilized" emulsion will typically exhibit separation when subjected to the high g-force in a centrifuge. Thus about 25 to about 40 mL of a test mixture, in measured amounts, of a soybean liquid with at least one demulsifier is placed into a 50 mL centrifuge tube (Nalgene Corporation), and secured in a IEC 822A 45 degree fixed angle rotor centrifuge after holding mixture at about 70° C. for about 1 hour. The counterbalanced sample is then centrifuged for fixed period, such as 10 seconds to about 1 hour, at about 2,000 to about 3,000 rpm, such as 2,500 rpm. When the centrifugation is complete the tube is examined for any separation, such as creaming, sedimentation, or suspended precipitation. The degree of creaming or sedimentation separation is measured and recorded. Additional evaluative tests as above can be accomplished which vary the amounts or type of the demulsifier(s), the heating period, and the like variables, to obtain predictable process conditions which will provide the desired separation of components with desired protein-to-fat ratios and demulsifier content.

All publications, patents, and patent documents cited are incorporated by reference herein in their entirety, as though individually incorporated by reference. The invention has been described with reference to various specific and preferred embodiments and techniques. However, it should be understood that many variations and modifications may be made while remaining within the spirit and scope of the invention.

What is claimed is:

1. A process comprising:
   mixing a soybean liquid with at least one demulsifier; and
   separating the resulting cream component from the reduced-fat soy milk component.

2. The process in accordance with claim 1, wherein soybean liquid is a full-fat soybean and water mixture with a protein-to-fat weight ratio of from about 2.0:1 to about 1.8:1 based on the combined weight of the full-fat soybean and water mixture.

3. The process in accordance with claim 1, wherein the reduced-fat liquid component is a reduced-fat soybean milk with a protein-to-fat weight ratio of from about 4.5:1 to about 3.25:1.

4. The process in accordance with claim 1, wherein the mixing is accomplished at a temperature of from about 60 to about 85° C.

5. The process in accordance with claim 1, wherein separating is accomplished with centrifugal force.

6. The process in accordance with claim 1, wherein at least one demulsifier is mixed in an amount of from about 0.01 to about 1.0 weight percent based on the weight of the soybean liquid.

7. The process in accordance with claim 1, wherein the at least one demulsifier has an HLB value of from about 2.6 to about 17.

8. The process in accordance with claim 1, wherein the at least one demulsifier has an HLB value of from about 2.8 to about 15.

9. The process in accordance with claim 1, wherein the at least one demulsifier is a food grade emulsifier capable of demulsifying fat globules in the soybean liquid and has a total monoglyceride content of from about 50 to about 70 weight percent, an alpha-monoglyceride content of from about 45 to about 60 weight percent.

10. The process in accordance with claim 1, wherein the at least one demulsifier is a mixture of from 2 to about 10 demulsifiers.

11. The process in accordance with claim 1, wherein the at least one demulsifier has an alpha-monoglyceride content of from about 70 to greater than 90 weight percent.

12. A process comprising:
    heating a mixture of from about 90 to about 99.99 weight percent of a full-fat soybean milk with from about 0.01 to about 1.0 weight percent a demulsifier at from about 70 to about 85° C. for about 0.5 to about 10 hours; and
    centrifugally separating the resulting less dense cream component from the more dense liquid component,
    wherein the full-fat soybean milk has a protein-to-fat ratio less than from about 2.0:1, and wherein the more dense liquid component has a protein-to-fat ratio greater than about 3.25:1.

13. A process in accordance with claim 12, wherein the more dense liquid component is a reduced-fat soybean milk with less than about 2 fat grams per 8 ounce serving and more than about 6.5 protein grams per 8 ounce serving.

14. A process in accordance with claim 12, wherein the full-fat soybean milk has a protein-to-fat ratio less than about 1.8:1, and the more dense liquid component has a protein-to-fat ratio greater than about 3.5:1.

15. A process in accordance with claims 12, wherein the full-fat soybean milk has a protein-to-fat ratio less than about 1.8:1, and the more dense liquid component has a protein-to-fat ratio greater than about 4.0:1.

16. A process in accordance with claim 12, wherein the heating is accomplished in from about 1 minute to about 5 hours.

17. A process in accordance with claim 12, further comprising adding at least one additive to the separated more dense liquid component.

* * * * *